United States Patent
Huff et al.

(10) Patent No.: US 8,949,523 B2
(45) Date of Patent: Feb. 3, 2015

(54) HIGH DENSITY DISK DRIVE PERFORMANCE ENHANCEMENT SYSTEM

(75) Inventors: Gregory L. Huff, The Woodlands, TX (US); Daniel S. Fisher, Dublin, CA (US); Daniel R. Zaharris, Longmont, CO (US)

(73) Assignee: LSI Corporation, San Jose, CA (US)

( * ) Notice: Subject to any disclaimer, the term of this patent is extended or adjusted under 35 U.S.C. 154(b) by 277 days.

(21) Appl. No.: 13/549,957

(22) Filed: Jul. 16, 2012

(65) Prior Publication Data

US 2014/0019681 A1 Jan. 16, 2014

(51) Int. Cl.
G06F 12/00 (2006.01)

(52) U.S. Cl.
USPC .......................................... 711/113

(58) Field of Classification Search
None
See application file for complete search history.

(56) References Cited

U.S. PATENT DOCUMENTS

| 7,076,604 B1 * | 7/2006 | Thelin ........................... 711/112 |
| 2005/0125603 A1 | 6/2005 | Ehrlich |

FOREIGN PATENT DOCUMENTS

EP 0974967 B1 6/2004

OTHER PUBLICATIONS

Tulloch, "Optimizing Your Servers' Pagefile Performance", © 2004 WindowsDevCenter.com, p. 1-6.*
Rintalan, "The Pagefile Done RIght!", © 2011 The Citrix Blog, p. 1-3.*

* cited by examiner

*Primary Examiner* — Brian Peugh
(74) *Attorney, Agent, or Firm* — Suiter Swantz pc llo

(57) ABSTRACT

The present invention provides an HDD performance enhancement system that utilizes excess disk capacity as cache memory to enhance the I/O performance of the drive. The cache memory is distributed throughout the disk, for example in alternating tracks, sectors dedicated to serving as cache, or other distributed cache track segments or segment groups. Distributing the cache throughout the disk reduces the physical distance of the I/O head to the closest available cache location. The system minimizes the write seek time by storing write data in the closest available cache location. High utilization data blocks are stored in multiple cache location locations to reduce read seek time for high utilization data. The cached data is eventually written to permanent memory and cleared from the cache during idle or low data storage utilization periods.

21 Claims, 7 Drawing Sheets

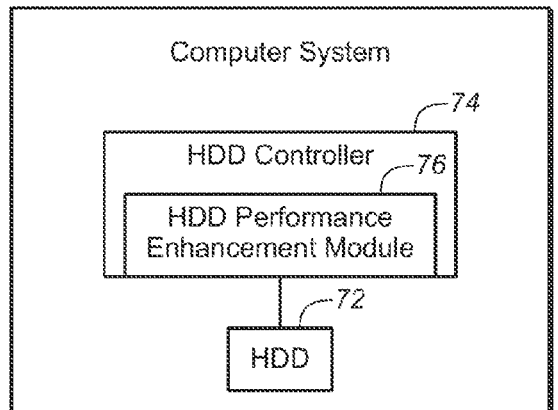
FIG. 7
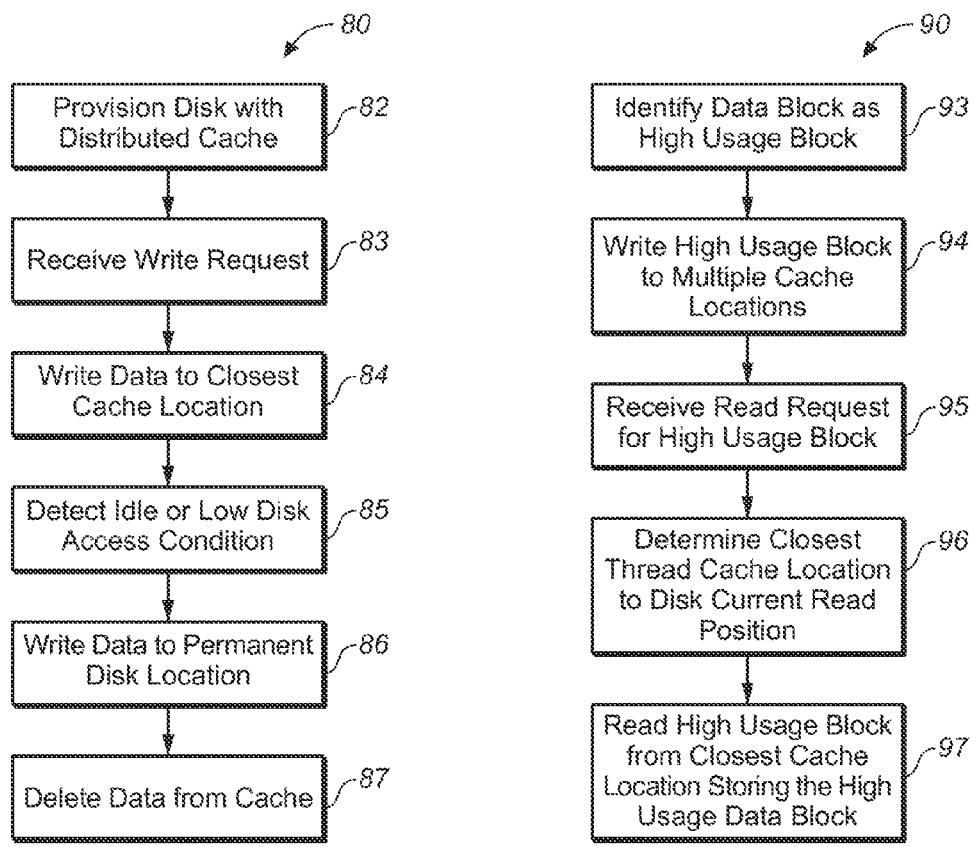
FIG. 8     FIG. 9

HIGH DENSITY DISK DRIVE PERFORMANCE ENHANCEMENT SYSTEM

TECHNICAL FIELD

The present invention relates to high density disk drives for computer systems and, more particularly, to a high density disk drive system using excess disk capacity as cache memory and related read/write protocols to enhance the I/O performance of the disk.

BACKGROUND

High density disk drives (HDDs) utilize a magnetic storage medium shaped as a disk and an I/O head that reads data from and writes to the magnetic disk. The drive spins the magnetic disk rapidly, currently 5,400 RPM and 7,200 RPM drives are widely used. The I/O head moves radially across the disk to reach any desired location on the disk for reading and writing data. In response to an I/O request, the drive has to spin the magnetic storage medium up to speed and also move the I/O head to the correct reading location, which imposes spinning disk and head move (seek) time latency into the I/O response. Computer users are demanding improved I/O performance of the non-volatile storage component of their personal computing devices. This has led to the adoption of solid-state non-volatile storage that eliminates the data access delays common to HDDs introduced by rotational latency of the spinning disk and the recording head move (seek) time required to access the customer or operating system requested data.

The solid-state storage approach described above presents a drawback, however, because the solid state storage is relatively expensive, requires additional circuit board space, and adds a significant component to the cost of the system. There is, therefore, a continuing need for techniques to improve HDD I/O performance. More particularly, there is a need for HDD systems that do not rely on expensive solid state memory to improve the I/O performance of the system.

SUMMARY

The present invention meets the needs described above through an HDD performance enhancement system that utilizes excess disk capacity as cache memory to enhance the I/O performance of the drive. The capacity of current HDDs developed for many personal computing devices has outpaced the demand for local non-volatile data storage. The invention provides an alternative to solid state memory to improve the data access time in HDDs. The inventive technique utilizes excess storage space on the HDD itself and, in this manner, avoids the need for the addition of expensive solid-state non-volatile components.

The cache memory is preferably distributed throughout the disk, for example on alternating tracks, sectors dedicated to serving as cache, or other distributed cache track segments or segment groups. Distributing the cache throughout the disk reduces the physical distance of the I/O head to the closest available cache location. The system minimizes the write seek time by storing write data in the closest available cache location. The cached write data is eventually written to permanent disk memory and cleared from the cache during idle or low data storage utilization periods. High utilization data may also be written to multiple cache locations distributed on the disk to reduce read seek time for high usage data. This allows the HDD to read the high utilization from the closest available block cache location to minimize read seek time.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE FIGURES

The numerous advantages of the invention may be better understood with reference to the accompanying figures in which:

FIG. 7 is a computer architecture diagram illustrating an HDD and HDD controller for implementing the HDD performance enhancement system utilizing distributed cache on the disk.

FIG. 8 is a logic flow diagram for the HDD performance enhancement system utilizing distributed cache on the disk.

FIG. 9 is a logic flow diagram for high utilization blocks in the HDD performance enhancement system utilizing distributed cache on the disk.

DETAILED DESCRIPTION OF ILLUSTRATIVE EMBODIMENTS

Figure 1:
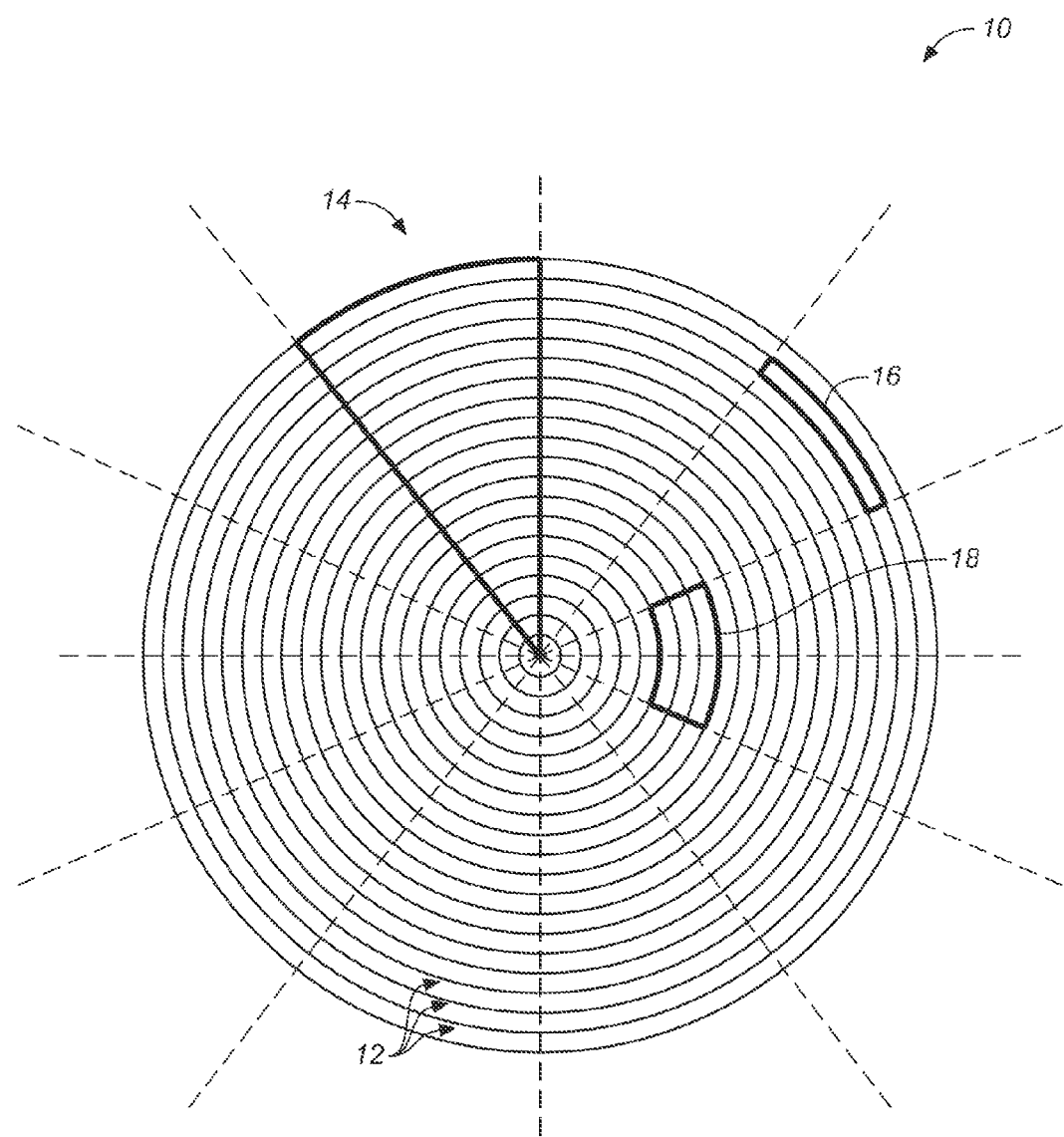
FIG. 1 is a conceptual illustration of a magnetic storage disk for an HDD illustrating potential cache locations.

The invention may be embodied in a performance enhancement system for Hard Disk Drives (HDDs) utilizing excess data storage space on the disk as distributed cache memory. For example, the invention may be, but need not be, implemented for 3.5" 7,200 RPM and 2.5" 5,400 RPM drives. In HDDs, the surface area of a magnetic disk is typically formatted with magnetic transitions that form circular tracks of information. Within these circular tracks there may be regularly spaced patterns of data that include track location information as well as track position information. These fields are commonly referred to as servo fields. The disk area between the servo fields may be filled with customer data sectors that are written and read as commanded by the host to store and retrieve user data.

Disk designers expect that the magnetic surface of the disk may, in some cases, contain defects that can result from the disk manufacturing process, defects formed in during ordinary disk usage, or a variety of other potential sources. To manage these defective disk areas, HDDs are typically formatted in an over-provisioned manner. The capacity represented by the spare sectors is not included in the specified formatted capacity of the HDD. Rather, these spare sectors are distributed on the disk and may be allocated during factory testing or disk formatting to prevent the use of defective disk areas while maintaining full formatted capacity of the HDD. The spare sectors may also be dynamically allocated in the field to allow for re-location of end user data in the event new defects are discovered.

Many methods exist in the deployment of spare data sectors, all of which have the intent of assuring that disk defects do not reduce the usable capacity of the HDD. In some recent implementations of HDDs where tracks may be written in an over-lapping method, commonly referred to as "shingled" recording, some portion of the formatted disk area may be allocated to cache to temporarily write data at a high rate to prevent performance degradation induced by the read-modify-write sequence required to update these over-lapping tracks on the majority of the disk surface. The unreported disk capacity is therefore allocated to address disk defects or reduce performance lost due to recording techniques implemented.

The capacity of current HDDs developed for many personal computing devices has outpaced the demand for local non-volatile data storage. At the same time computer users are demanding improved performance of the non-volatile storage components of their personal computing devices. This has led to the adoption of solid-state non-volatile storage that eliminates the data access delays common to HDDs introduced by rotational latency of the spinning disk and the recording head move (seek) time required to access the customer or operating system requested data.

The present invention provides an alternative way to improve the data access time in HDDs that does not require the addition of expensive solid-state non-volatile components. Rather than solid state memory, the invention utilizes excess storage capacity in the HDD magnetic disk to improve system performance. For example, state-of-the-art 2.5 inch HDDs yield a formatted user capacity of 500 GB per disk surface. A potential implementation may be to specify the capacity to be 250 GB per surface and utilize the remaining 250 GB of formatted capacity as cache memory to reduce the delays associated with accessing requested data.

In one particular implementation, the cache locations for unallocated data may be reserved on alternating tracks (every other track) on the disk. With this implementation, the HDD accepts host write data and immediately writes this data on the disk on the nearest cache track and available sector(s). This technique virtually eliminates the head seek time and rotational latency delays typically associated with the mechanical components of an HDD.

Read performance may also be greatly enhanced by placing multiple copies of frequently accessed user and critical operating system data (high usage blocks) to significantly reduce the system delays of accessing the high usage blocks.

Utilizing this technology is expected to achieve similar I/O performance expected for 15,000 RPM drives in 7,200 RPM disk and 5,400 RPM drives. That is, approximately 50% of the storage capacity is sacrificed in the 7,200 RPM and 5,400 RPM drives in order to achieve the I/O performance expected from 15,000 RPM drives. In addition, calculations indicate that 7,200 RPM and 5,400 RPM drives may experience performance improvements of about 50% for read operation and 90% for write operations. These particular drives are only example embodiments and other drives can be expected to achieve similar performance improvements through use of this technology.

Of course, many other specific layouts for the distributed cache locations could be utilized to implement the concept of distributing large amounts of spare capacity across the surface of the disk with the intent of reducing the time required to access and store data on a rotating disk. In addition, the use of 50% of the tracks for cache memory is provided as an example, but other percentages may be dedicated to cache as a matter of design choice.

Figure 2:
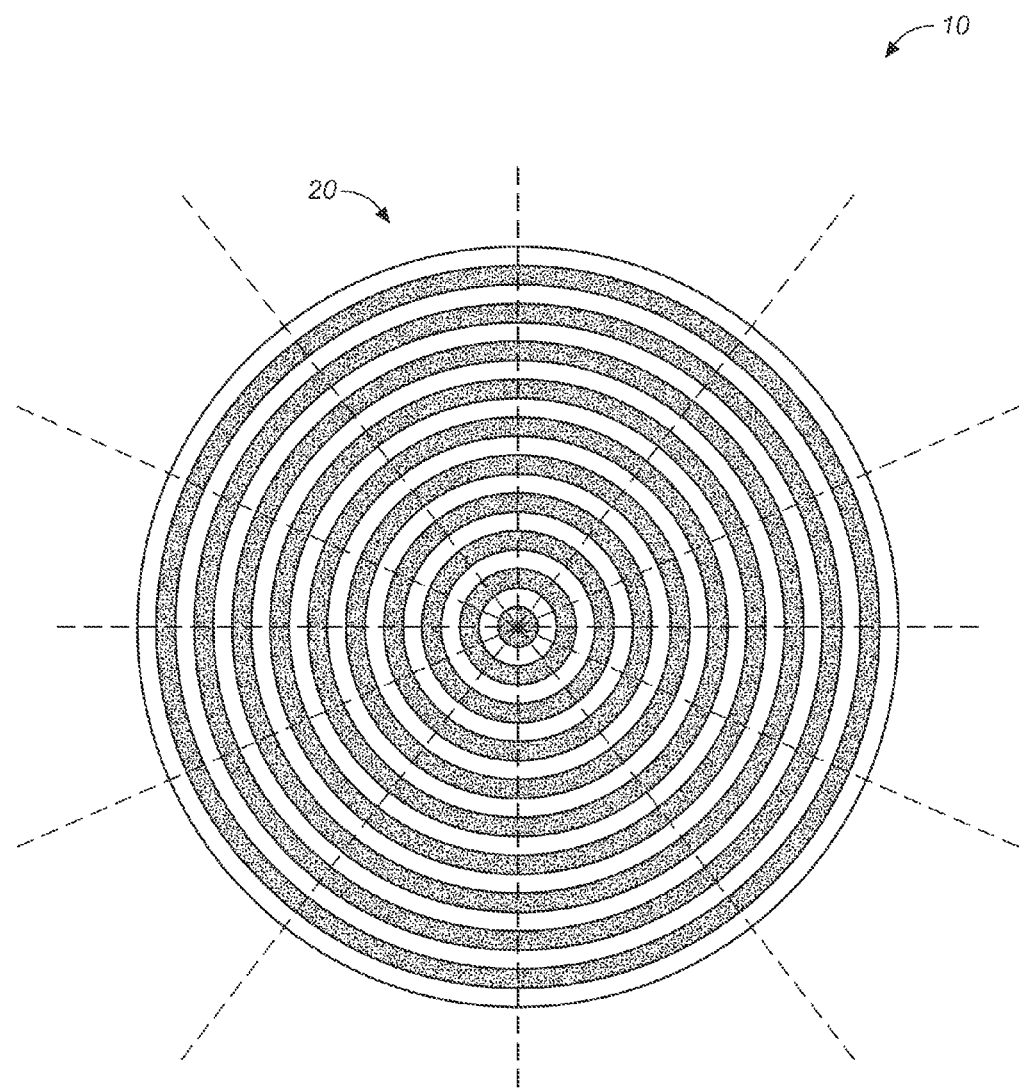
FIG. 2 is a track diagram of a magnetic storage disk for an HDD illustrating cache located on alternating tracks on the disk.
Figure 3:
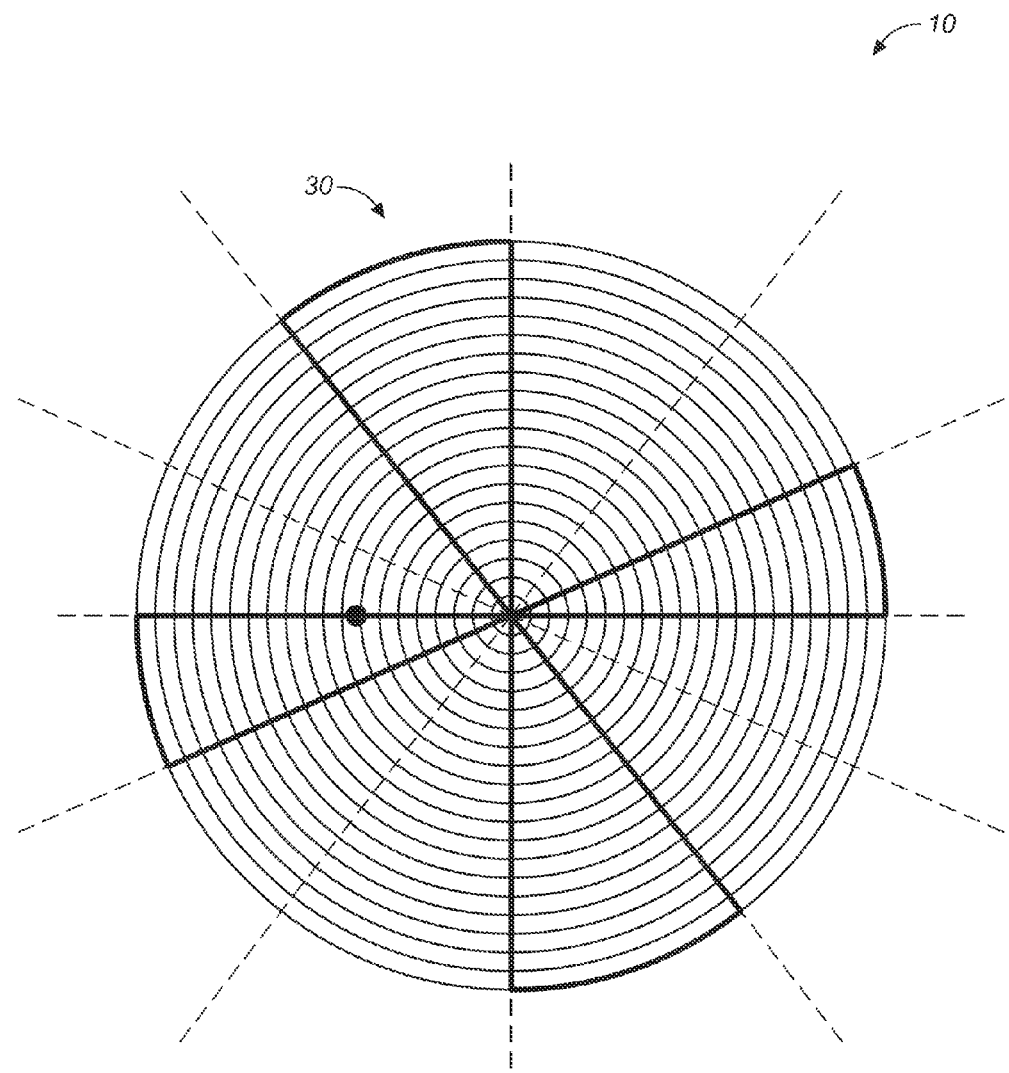
FIG. 3 is a track diagram of a magnetic storage disk for an HDD illustrating cache located on distributed sectors on the disk.
Figure 4:
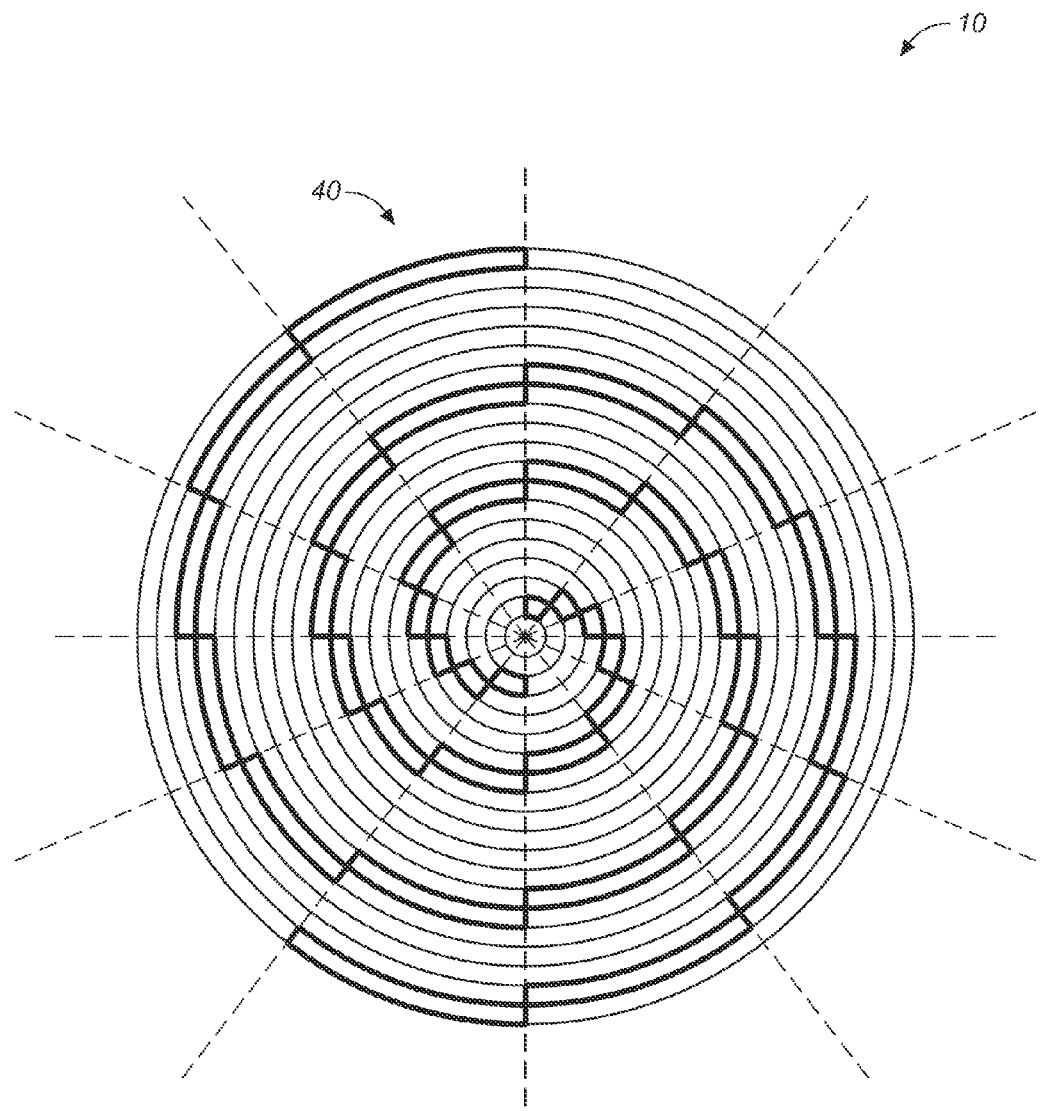
FIG. 4 is a track diagram of a magnetic storage disk for an HDD illustrating cache located on track segments forming a spiral pattern on the disk.
Figure 5:
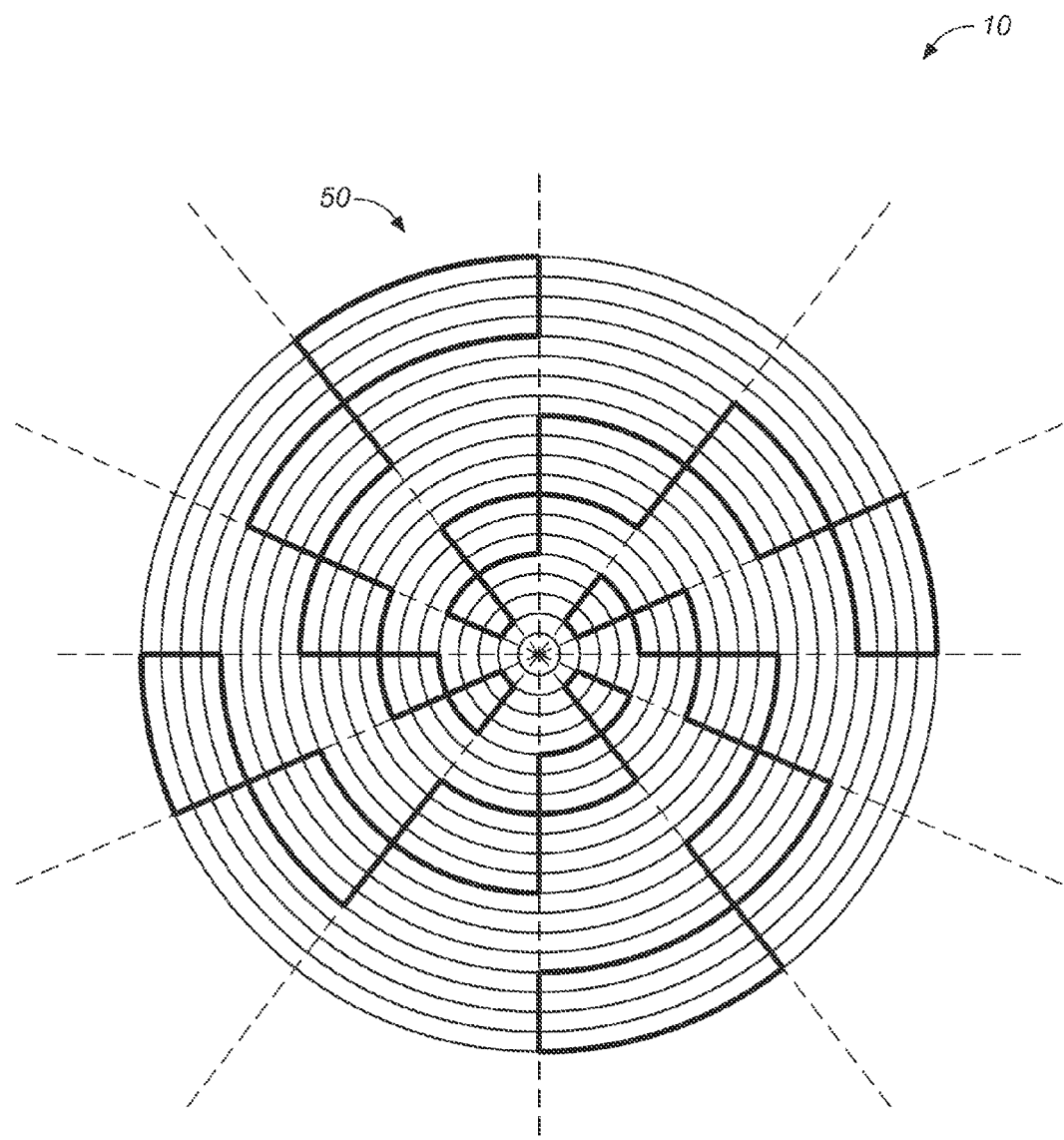
FIG. 5 is a track diagram of a magnetic storage disk for an HDD illustrating cache located on track segment groups forming a spiral pattern on the disk.

Referring now to the figures, FIG. 1 is a conceptual illustration of a magnetic storage disk 10 for an HDD illustrating potential cache locations. The disk is divided into a number of concentric circular tracks 12 covering the usable storage space of the disk. The disk is also divided into wedge-shaped sectors 14 that include a portion of each track within the area of the sector. For descriptive convenience, FIG. 1 also defines a track segment 16 as the portion of a track inside a particular sector. A segment group 18 is also defined to include a number of contiguous track segments. The cache memory may be distributed on the disk 10 in any desired variety of tracks, sectors, segments and segment groups. For example, FIG. 2 is a track diagram 20 of a magnetic storage disk for an HDD illustrating cache located on alternating tracks on the disk. This particular configuration is advantageous because it greatly reduces write seek time, as the I/O head only needs to move one track over to reach the nearest cache location. Other cache configurations may also be implemented. As an additional example, FIG. 3 is a track diagram 30 illustrating cache located on distributed sectors on the disk. In this example, 25% of the sectors are dedicated to cache memory. FIG. 4 is a track diagram 40 illustrating cache located on track segments forming a spiral pattern on the disk and FIG. 5 is a track diagram 50 of illustrating cache located on track segment groups forming a spiral pattern on the disk. In these examples, about 20% of the sectors are dedicated to cache memory.

Figure 6:
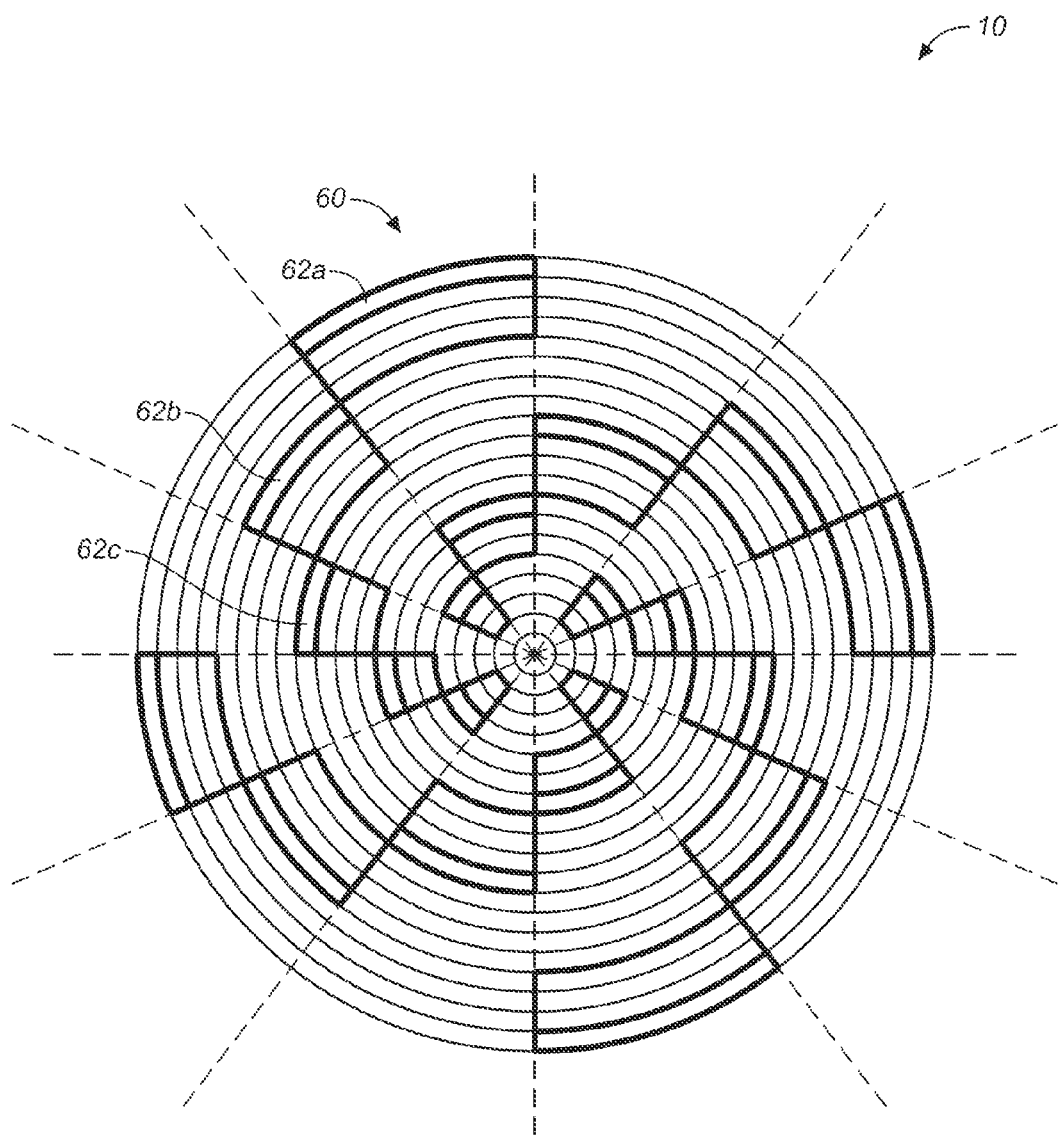
FIG. 6 is a track diagram of a magnetic storage disk for an HDD illustrating multiple storage locations for a high utilization block.

FIG. 6 is a track diagram 60 illustrating multiple storage locations for a high utilization data block. In this example, the cache memory is configured as track segment groups forming a spiral pattern on the disk. The outermost segment of each segment group is used multiple copies of the high usage data block. While only three of these outermost segments 62a-c and enumerated in FIG. 6, similar blocks are shown and may be included in each segment group. Any variety of tracks, segments and/or segment groups may be used for cache memory as a matter of design choice FIG. 7 is a computer architecture diagram of a computer 70 having a HDD 72 and HDD controller 74. The HDD controller 74 includes the HDD performance enhancement module 76, which distributes the cache memory space on the disk and implements the associated I/O procedures.

FIG. 8 is a logic flow diagram 80 for the HDD performance enhancement system. In step 82, the HDD controller provisions the disk with distributed cache memory, as illustrated for several example configurations in FIGS. 1-5. Step 82 is followed by step 83, in which the HDD controller receives a write request. Step 83 is followed by step 84, in which the HDD controller writes the data to the closest available cache location, which minimizes the write seek time dramatically over conventional HDD systems. Step 84 is followed by step 85, in which the HDD controller detects an idle or low data storage access condition, for example when data access requests fall below a predefined threshold for a predefined period of time. Step 85 is followed by step 86, in which the HDD controller writes the data stored in the cache memory to permanent memory locations on the disk during the idle or low data storage access condition. Step 86 is followed by step 87, in which the HDD controller deletes from the cache memory the data that has been written to permanent storage locations on the disk. Alternatively, the write cache region may be made available for subsequent write requests once the data is relocated safely without actually deleting any data from the cache.

FIG. 9 is a logic flow diagram 90 for high utilization blocks in the HDD performance enhancement system. In step 93, the HDD controller determines that a data block is a high usage data block, for example when I/O read requests for the data block rise above a predefined threshold for a predefined period of time. Step 93 is followed by step 94, in which the HDD controller writes the high usage data block to multiple cache locations distributed on the disk, as illustrated for one particular example in FIG. 6. An alternate method is to simply to write copies of the data to the read regions on the disk. Step 94 is followed by step 95, in which the HDD controller receives a subsequent I/O read request for the high usage block. Step 95 is followed by step 96, in which the HDD controller determines the closest cache location for the block to the current position of the I/O head. Step 96 is followed by step 97, in which the HDD controller moves to and reads the high usage block from the closest cache location for the block. This greatly reduces the read time for the subsequent I/O read requests for the high usage data block.

It should be noted that the concept of (write or read) cache segments as shown in FIGS. 1, 3, 4, and 5 may not be practical implementations of the high performance format. The reason for this is that many one track seeks would be involved in reading or writing to this type of region embodiment adding mechanical latencies, which is what the high performance embodiments are employed to minimize. HDDs have high transfer rates reading and writing sequential sectors if they are not interrupted by having to move the head (seek) or wait for the target sector to come by (rotational latency). The read regions would normally be organized as contiguous tracks, that way seek latency is minimized and employ shingled recording is facilitated. The write cache regions would also be organized as contiguous tracks but may be as little as one track in size. Nevertheless, the additional potential embodiments are disclosed to show possible implementations of the invention.

Another key aspect of the write regions is that the system can write immediately (once the head is positioned and settled on the track) eliminating the rotational latency. The write cache region can be thought of as a scratch pad. Once the data is relocated in the normal read data region the cache region is freed up for another write with no sector orientation is required.

The read regions may actually be copies of the data, so that wherever the head is located at the time of a read request minimize the time it takes to position the head to the requested data can be minimized. Also if the copied data was rotationally skewed (say by ½ rev) the system reduces the rotational latency by ½.

The present invention may consist (but not required to consist) of adapting or reconfiguring presently existing systems. Alternatively, original equipment may be provided embodying the invention.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

It is further contemplated that each of the embodiments of the method described above may include any other step(s) of any other method(s) described herein. In addition, each of the embodiments of the method described above may be performed by any of the systems described herein.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that magnetic aspects of implementations will typically employ magnetically-oriented hardware, software, and or firmware.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Furthermore, it is to be understood that the invention is defined by the appended claims.

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

The invention claimed is:

1. An enhanced performance high density disk storage system, comprising:
   a high density disk drive comprising a magnetic disk for storing electronic data, the drive operative for spinning the disk, reading data from the disk, and writing data to the disk through an I/O head that travels over the disk, wherein the drive experiences I/O performance comprising write seek times when searching for available space to store write data and read seek times when searching for requested read data; and
   a high density disk controller operative for distributing cache memory locations on the magnetic disk, writing data to the cache memory locations, and reading data from the cache memory locations to enhance I/O performance of the drive through reduced write and read seek times, the controller is further operative to responding to an I/O write request by writing the data to an available cache memory location closest to the location of the I/O head at the time of the I/O write request, detecting an idle or low data access condition for the drive, storing the write data in permanent memory locations, deleting the write data from the cache memory locations during the idle or low data access condition, and determining the idle or low data access condition by determining that access to the drive has fallen below a predetermined threshold for a predetermined time.

2. The system of claim 1, wherein the cache memory locations comprise alternating tracks on the disk.

3. The system of claim 1, wherein the cache memory locations comprise one or more sectors reserved for cache memory.

4. The system of claim 1, wherein the cache memory locations comprise a plurality of track segments distributed on the disk.

5. The system of claim 1, wherein the cache memory locations comprise a plurality of track segment groups distributed on the disk.

6. An enhanced performance high density disk storage system, comprising:
   a high density disk drive comprising a magnetic disk for storing electronic data, the drive operative for spinning the disk, reading data from the disk, and writing data to the disk through an I/O head that travels over the disk, wherein the drive experiences I/O performance comprising write seek times when searching for available space to store write data and read seek times when searching for requested read data; and
   a high density disk controller operative for distributing cache memory locations on the magnetic disk, writing data to the cache memory locations, and reading data from the cache memory locations to enhance I/O performance of the drive through reduced write and read seek times, wherein the controller is further operative to identifying a high usage data block, storing the high usage data block in multiple cache memory locations distributed on the disk, receiving a subsequent I/O read request for the high usage data block, and reading the high usage data block from a closest cache memory location storing the high usage data block.

7. A method for enhancing the performance of a high density disk drive that includes a magnetic disk for storing electronic data, the drive operative for spinning the disk, reading data from the disk, and writing data to the disk through an I/O head that travels over the disk, wherein the drive experiences I/O performance comprising write seek times when searching for available space to store write data and read seek times when searching for requested read data, comprising the steps of:
   distributing cache memory locations on the magnetic disk;
   writing data to the cache memory locations;
   reading data from the cache memory locations;
   identifying a high usage data block;
   storing the high usage data block in multiple cache memory locations distributed on the disk;
   receiving a subsequent I/O read request for the high usage data block; and
   reading the high usage data block from a closest cache memory location storing the high usage data block,
   wherein data is written to and read from the cache memory locations to enhance the I/O performance of the high density disk drive through reduced write and read seek times.

8. The method of claim 7, further comprising the step of configuring the cache memory locations as alternating tracks on the disk.

9. The method of claim 7, further comprising the step of configuring the cache memory locations as one or more sectors reserved for cache memory.

10. The method of claim 7, further comprising the step of configuring the cache memory locations as a plurality of track segments distributed on the disk.

11. The method of claim 7, further comprising the step of configuring the cache memory locations as a plurality of track segment groups distributed on the disk.

12. The method of claim 7, further comprising the step of responding to an I/O write request by writing the data to an available cache memory location closest to the location of the I/O head at the time of the I/O write request.

13. The method of claim 7, further comprising the steps of detecting an idle or low data access condition for the drive, storing the write data in permanent memory locations, and deleting the write data from the cache memory locations during the idle or low data access condition.

14. The method of claim 13, further comprising the steps of determining the idle or low data access condition by determining that access to the drive has fallen below a predetermined threshold for a predetermined time.

15. A computer storage disk storing non-transitory computer executable instructions for causing a computer system to enhance the performance of a high density disk drive that includes a magnetic disk for storing electronic data, the drive operative for spinning the disk, reading data from the disk, and writing data to the disk through an I/O head that travels over the disk, wherein the drive experiences I/O performance comprising write seek times when searching for available space to store write data and read seek times when searching for requested read data, comprising the steps of:
  distributing cache memory locations on the magnetic disk;
  writing data to the cache memory locations;
  reading data from the cache memory locations;
  identifying a high usage data block;
  storing the high usage data block in multiple cache memory locations distributed on the disk;
  receiving a subsequent I/O read request for the high usage data block; and
  reading the high usage data block from a closest cache memory location storing the high usage data block, wherein data is written to and read from the cache memory locations to enhance the I/O performance of the high density disk drive through reduced write and read seek times.

16. The computer storage disk of claim 15, wherein the computer executable instructions further comprise the step of configuring the cache memory locations as alternating tracks on the disk.

17. The computer storage disk of claim 15, wherein the computer executable instructions further comprise the step of configuring the cache memory locations as one or more sectors reserved for cache memory.

18. The computer storage disk of claim 15, wherein the computer executable instructions further comprise the step of configuring the cache memory locations as a plurality of track segments distributed on the disk.

19. The computer storage disk of claim 15, wherein the computer executable instructions further comprise the step of configuring the cache memory locations as a plurality of track segment groups distributed on the disk.

20. The computer storage disk of claim 15, wherein the computer executable instructions further comprise the step of responding to an I/O write request by writing the data to an available cache memory location closest to the location of the I/O head at the time of the I/O write request.

21. The computer storage disk of claim 15, wherein the computer executable instructions further comprise the steps of detecting an idle or low data access condition for the drive, storing the write data in permanent memory locations, and deleting the write data from the cache memory locations during the idle or low data access condition.

* * * * *